UNITED STATES PATENT OFFICE.

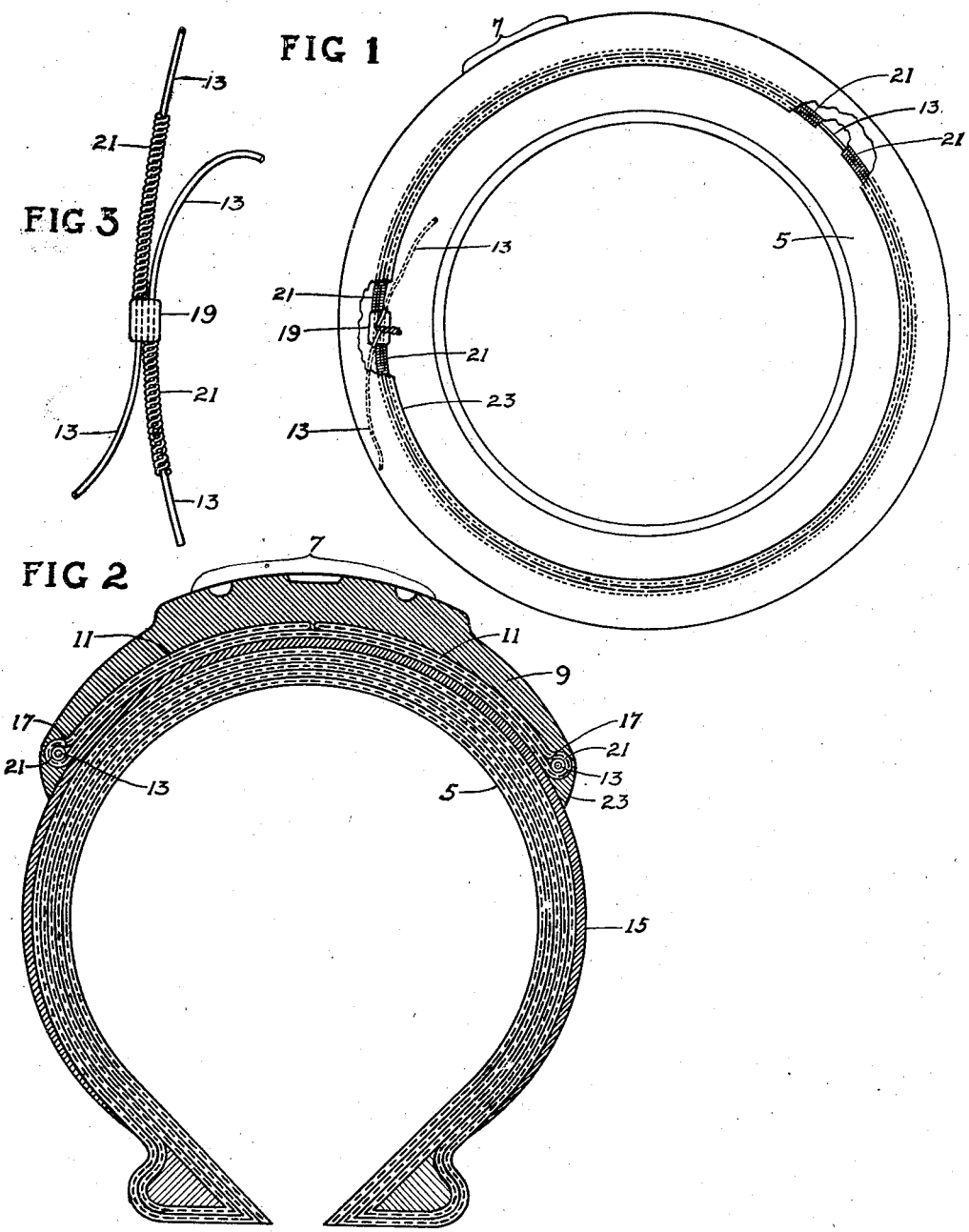

GEORGE W. TAYLOR, OF EVERETT, MASSACHUSETTS.

TREAD FOR TIRES.

1,378,148.

Specification of Letters Patent. Patented May 17, 1921.

Application filed July 13, 1920. Serial No. 395,917.

*To all whom it may concern:*

Be it known that I, GEORGE W. TAYLOR, a citizen of the United States, and a resident of Everett, county of Middlesex, and State of Massachusetts, have invented an Improvement in Treads for Tires, of which the following description, in connection with the accompanying drawings, is a specification, like characters on the drawings representing like parts.

This invention relates to the detachable tread members for vehicle tires, particularly for those of the pneumatic type and the purpose is to provide an improved device of this nature which may be firmly secured to the tire so that it will not be detached or loosened by side strains or the like when the vehicle is running.

My invention will best be understood by reference to the following description of an illustrative embodiment thereof shown by way of example in the accompanying drawings, wherein:

Figure 1 is a side elevation of a vehicle tire with a tread embodying my invention applied thereto, parts being broken away;

Fig. 2 is a transverse section of the same on an enlarged scale; and

Fig. 3 is a detail of the securing means.

Referring to the drawings, I have there shown as an example of my invention a detachable tread adapted to be applied to a pneumatic tire shoe 5 of known type. The tread embodies a flexible annular body 7, preferably endless, which may be constructed of any of the known materials or combinations of materials utilized in making tire shoes. For brevity it might be characterized as being of rubber construction. That is, as here shown it is somewhat similar to a tire shoe embodying an outer bearing surface or tread of suitable rubber compound 9 and a supporting body or carcass 11 of fabric or the like. The tread 7 is molded to form to fit and cover the outer surface of the tire 5.

To secure the tread member firmly to the tire I utilize suitable binding members 13 which are constrictable, that is, which may be drawn up to tension the same, these members, here shown as wires, being incased in the margins of the tread 7. Preferably the parts are so proportioned that these members lie outwardly of the points 15 at the extremities of the maximum transverse diameter of the tire shoe 5 so that as they are drawn up they bind the tread down directly to the tire 5. The wires 13 are received in suitable passage-ways 17 formed at the margins of the tread within the canvas carcass 11 and as shown in Figs. 1 and 3 the ends may pass through a block 19. When the tread is applied to the tire the ends of the wires project in the dotted line position through the sides of the tread and are drawn up by a suitable instrument tightly to bind the tread on the tire. They may then be twisted about the block 19 as shown in full lines in Fig. 1 to maintain the tension.

It is important that the passage-ways 17 be maintained open to permit the binder 13 to move freely therein so that the diminution of the length thereof will be distributed throughout the tire. The passage-ways must be reinforced to prevent these binders from cutting through the tread. I therefore supply suitable means for supporting the walls of the passage-ways, which means also provides resistant bearings for the binders. The binders 13 may be loosely disposed within a flexible tube conveniently formed by a coil spring 21. The turns or spires in the spring receive the wire 13 and prevent it from cutting through the tread, the wire freely slipping over these spires as it is drawn up. The spring, moreover, is freely flexible so that it will yield with the tire in use and is extensible and contractible lengthwise to compensate for the tightening action and to give in the use of the tire without cutting through the adjacent flexible material of which the tread is composed. Cross sectionally considered, however, the spring is substantially rigid and forms an open passage-way in which the binder 13 is loosely received.

The margins of the tread outward of the bead-like portions formed by the binders 13 may be provided with relatively flexible lips 23 adapted to hug the walls of the tire 5 and exclude dirt and moisture.

In applying a tread as described the tire 5 is preferably deflated, the tread 7 is placed in position, and the binders 13 are drawn up by means of some powerful instrument directly binding the tread 7 on and over the top of the tire. The ends of the binders 13 are then secured and the tire is inflated. The powerful constricting action of the binders 13 exerted directly downwardly on the tire outwardly of the points 15 provides for an absolutely secure positioning of the tread so that it cannot become detached in use, for example under the severe sidewise strains which are set up when a motor vehicle turns a corner or skids.

Having thus described in detail the particular embodiment of my invention shown by way of example in the accompanying drawings, the principles exemplified thereby which I claim as new and desire to secure by Letters Patent I shall express in the following claims.

Claims—

1. A tread for tires comprising an annular body having at the margins thereof flexible extensible tubular members substantially rigid in cross section and constrictable binding elements loosely received in said members.

2. A tread for tires comprising an annular body of rubber construction having spiral springs incased in the margins thereof and constrictable binding wires received in the springs.

3. A tread for tires comprising an annular body of rubber construction having open passageways in the margins thereof, constrictable binders loosely received in the passageways and means for supporting the walls of the passageways and providing resistant bearings for the binders.

In testimony whereof, I have signed my name to this specification.

GEORGE W. TAYLOR.